(12) United States Patent
Michel et al.

(10) Patent No.: US 7,673,285 B1  
(45) Date of Patent: Mar. 2, 2010

(54) SYSTEM AND METHODS FOR GENERATING A SOFTWARE COMPONENT INTERFACE

(75) Inventors: Ruben Michel, Hopkinton, MA (US); Stanislav Sosnovsky, Upton, MA (US); Richard F. Cormier, Franklin, MA (US); Ilya Liubovich, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1286 days.

(21) Appl. No.: 11/166,934

(22) Filed: Jun. 24, 2005

(51) Int. Cl.  
*G06F 9/44* (2006.01)

(52) U.S. Cl. .................... 717/107; 717/116; 717/121

(58) Field of Classification Search ................ 717/107, 717/116, 121  
See application file for complete search history.

(56) References Cited

U.S. PATENT DOCUMENTS 6,633,923 B1   10/2003  Kukura et al. ............... 709/316  
6,959,307 B2 *  10/2005  Apte ........................ 707/104.1

* cited by examiner

*Primary Examiner*—Chuck O Kendall  
(74) *Attorney, Agent, or Firm*—Chapin IP Law, LLC

(57) ABSTRACT

A system provides a generation tool that emits a method declaration in a coFactory, and further emits the method's definition in a coBridge. Locating a naming service is delegated to a server infrastructure, and names of the sought after interface and the required component are further emitted. The generative approach disclosed assures a proper type of a downcast. Errors are handled by throwing an exception if either the component or its interface is absent. The coClass implements the coFactories, and a developer of a component can access other component by simply invoking a method within the coClass, which is implemented in a coBridge.

11 Claims, 2 Drawing Sheets

SYSTEM AND METHODS FOR GENERATING A SOFTWARE COMPONENT INTERFACE

BACKGROUND

A large software development environment relies on many developers, or software engineers, developing systems including many software elements. Each software element includes multiple objects, and is spread across many files. Typically, the files include source code, or human readable versions, of computer instructions, and are modifiable by the developers. As is known in the industry, the source code is compiled into object code and eventually into executable code, which is a set of instructions executable by a processor on the target machine for which the system was developed.

Software objects in conventional software systems include or inherit methods and attributes from other objects in the system. Inheritance is usually defined in terms of classes, which inherit other classes (or subclasses), resulting in a complex hierarchical or matrix pattern of inheritance, often called an inheritance hierarchy. Inheritance results in a dependency between the objects or classes, as changes to a particular class triggers a need to propagate the change to classes which inherit, or depend on, the changed class. Such dependencies are typically resolved by a build, which recompiles the affected entities to propagate the changes to dependent classes.

Modern software development methodologies are exhibiting a trend toward so-called middleware based implementations. One popular middleware implementation is CORBA. CORBA is the acronym for Common Object Request Broker Architecture, OMG's open, vendor-independent architecture and infrastructure that computer applications use to work together over networks. CORBA applications are composed of objects, which are individual units of running software that combine functionality and data, and that frequently (but not always) represent something in the real world. In a typical middleware based object oriented architecture, there are many instances of an object of a single type—for example, an e-commerce website would have many shopping cart object instances, all identical in functionality but differing in that each is assigned to a different customer, and contains data representing the merchandise that its particular customer has selected. For other types, there may be fewer instances.

For each object type, such as the shopping cart mentioned above, a developer using middleware such as CORBA, defines an interface in an Interface Description Language (IDL). The interface is a syntax part of a contract that a server object offers to client programs that invoke functionality and access data within that server object. Any client that wants to invoke an operation on the object employs this IDL interface specification (i.e., object specification) to specify the operation the client wants to perform, and to marshal arguments (i.e., parameters or data) that the client sends and receives from the server for access to that object.

The use of a middleware-specific interface, such as a CORBA call, that is separate from the middleware implementation, enabled by the IDL, is one essence of middleware such as CORBA and explains how conventional middleware enables interoperability between applications with all of the above noted transparencies. The interface to each object using a conventional middleware platform is defined very strictly. However, CORBA and other middleware platforms hide the implementation of an object (i.e., its running code and its data) from the rest of the system (that is, middleware encapsulates the implementation) behind a boundary that the client application may not cross. Clients access objects only through their advertised CORBA (or other middleware-specific) interface, invoking only those CORBA (or other middleware) operations that the object exposes through its IDL interface, with only those CORBA (or other middleware) parameters (input and output) that are included in the invocation.

SUMMARY

Disclosed herein is a Bridge Design Pattern that bridges between two object models, typically an abstraction and its implementation. The invention operates within the context of a model that provides for a categorical approach to solve a practical variant of this problem: Given an object model, specified in OMG IDL (IDL for conciseness), generate an abstraction of that object model that preserves the application semantics, but is CORBA independent. In addition, generate an implementation of that abstraction for a particular middleware.

Functionality exposed through CORBA stubs or skeletons requires knowledge of IDL and its specific language mappings (to Java, C++, etc). Application programmers, who often lack this knowledge, can become significantly more productive if they program using CORBA-independent stubs and skeletons.

Additionally, creating components and accessing existing components is difficult and error-prone in conventional distributed environments. The typical approach for tackling these problems is to introduce a mediator, such as a naming or a trading service. These mediators typically locate a service by a name or a set of properties, expressed by strings. Thus, to locate a component, a programmer might issue the following:

NamingContextExt nc= . . . ;
Object o=nc.resolve("MyComponent");
MyComponent myComponent=MyComponentHelper.narrow(o);

Example of Locating a CORBA Interface.

The three simple lines in the above example illustrate the difficulties. First, locating mediator (such as, for example, a naming or trading service)services in a federated environment may be complex. These services must be kept synchronized and must be resilient to crashes, often requiring complex error handling. With the service in hand, obtaining the desired reference involves a weakly typed invocation, based on the reference's name or properties. Mistyping the name or one of the properties will invariably yield a run-time error. Finally, since the service resolves arbitrary references, a downcast or narrow must follow the resolution. A downcast to an incorrect type will again yield a run-time error.

Configurations herein disclose a system and method in a software build system for emitting strongly typed bridges into a client component to access interfaces of server components. As an example of an embodiments of the invention, suppose a component requires access to an interface of another component on which it depends. The system of the invention provides a generation tool that emits a method declaration in a coFactory (to be explained), and further emits the method's definition in a coBridge (also to be explained). With application of the invention, locating the mediator is delegated to a server infrastructure, and the names of the sought after interface and the required component are emitted. Finally, the generative approach disclosed herein guarantees the proper type of a downcast. Errors are handled by throwing an exception if either the component or its interface is absent. As disclosed herein, the coClass implements the coFactories, and the developer of the component can access the other component by simply invoking a method within the coClass, which is implemented in the coBridge as will be explained. Thus problems described above are substantially circumvented by a trivial function invocation.

In addition, embodiments provide a factory that solves a version upgrade problem. Specifically, consider the case where a client requests version 1.2 of a component, while the component server hosts version 1.4. Noticing that the major numbers are identical, and the minor number requested by the client is smaller than the minor number of the component in the component server, the mediator transparently retrieves the version 1.4 component. If, however, the client requests version 1.5 of that component, then the mediator would refuse the request by throwing an exception. The system thus operates to overcome this versioning problem.

Alternate configurations of the invention include a computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In a component architecture suitable for use with the configurations herein, creating components 110 (referenced below in FIG. 1) and accessing existing components 110 for invoking services via service interfaces 112 (FIG. 1, below) tends to be difficult and error-prone in distributed environments. In such an environment, for example, a naming resolution typo results in runtime string mismatch error—since recognition is by text string, rather than variable/identifier, an otherwise minor error is moved from compile time to runtime.

The typical approach for tackling these problems is to introduce a mediator, such as a naming or a trading service. These mediators typically locate a service by a name or a set of properties, expressed by strings. Thus, to locate a component, a programmer might issue the exemplary code fragment shown in Table I:

TABLE I

NamingContextExt nc = . . . ;
  Object o = nc.resolve("MyComponent");
  MyComponent myComponent = MyComponentHelper.narrow(o);

The code fragment in Table 1 illustrates the difficulties encountered in conventional approaches. First, locating the mediator in a federated environment may be complex. These services must be kept synchronized and must be resilient to crashes, often requiring complex error handling. With the service in hand, obtaining the desired reference involves a weakly typed invocation, based on the reference's name or properties. Mistyping the name or one of the properties will invariably yield a run-time error. Finally, since the service resolves arbitrary references, a downcast or narrow must follow the resolution. A downcast to an incorrect type will again yield a run-time error. The bridge, discussed further below with respect to Table II, substantially overcomes the shortcomings presented by conventional name services.

Figure 1:
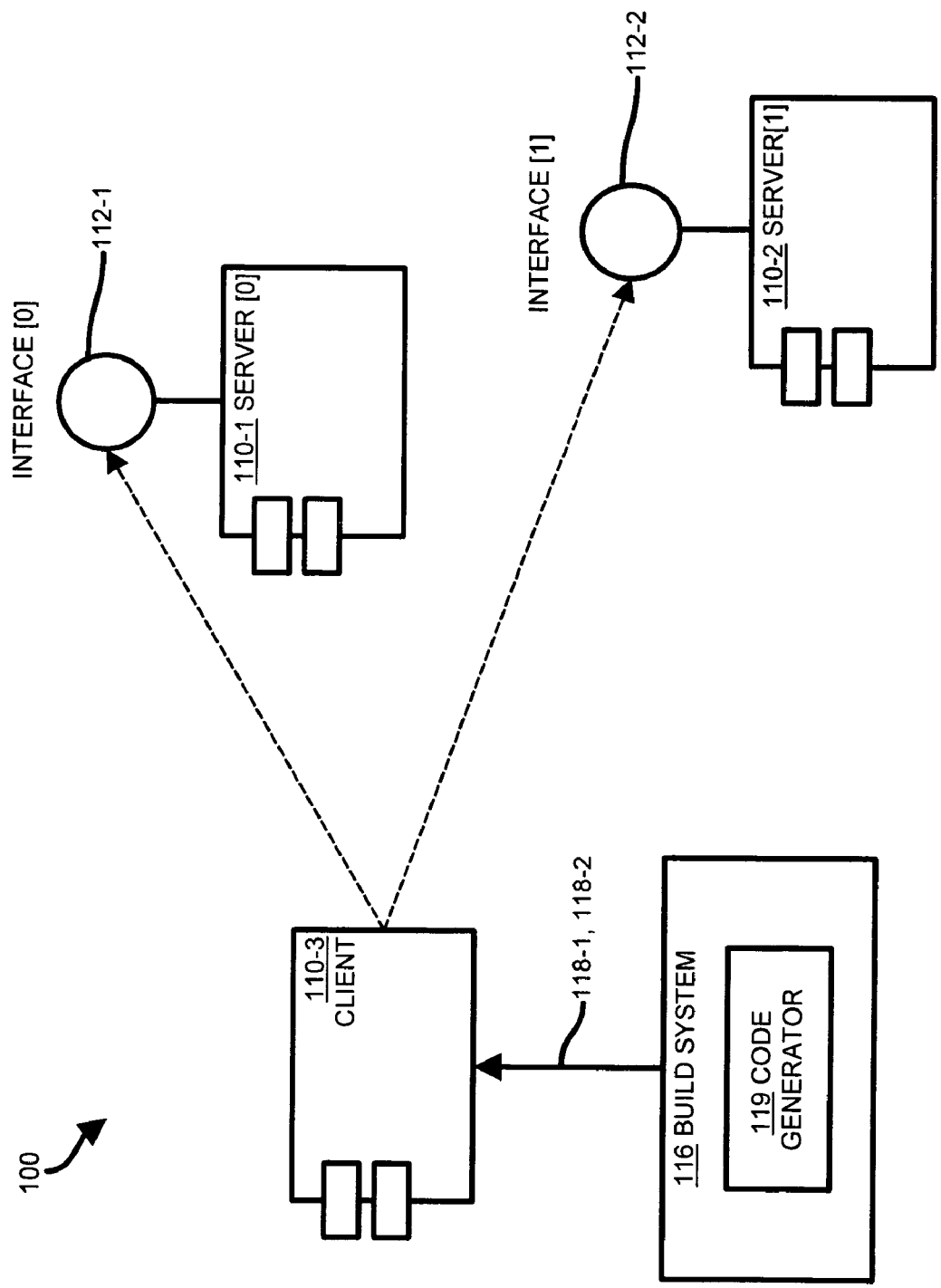
FIG. 1 is a block diagram of a representation of software components for generating a software component interface as disclosed herein.

Referring to FIG. 1, a managed information environment 100 includes a plurality of components 110, including one or more server components 110-1, 110-2 and one or more client components 110-3. Each of the components 110 has a plurality of interfaces 112-1, 112-2, generally, for access by client components such as 110-3. As a result of dependencies between the components, the code generator 119 emits a bridge 118. The bridge 118 is emitted to the client component 110-3 for each interface 112-1 and 112-2 of the dependent server component 110-1 and 110-2. More specifically, the build system 116 emits strongly typed bridges 118-1, 118-2 into the client component 110-3, to access interface 112-1 and interface 112-2 of the server components 110-1 and 110-2, respectively.

The aforementioned build system is discussed further in copending U.S. patent application Ser. No. 11/094,773, filed Mar. 30, 2005, entitled "SYSTEM AND METHODS FOR DEFINING A SOFTWARE BUILD", assigned to the assignee of the present application and incorporated herein by reference.

The following illustrates an example code fragment suitable for use in explaining embodiments of the invention:

TABLE II

```
public com.emc.eccapi.bridge.book.IBookDiscovery
_create_book_BookDiscovery( )
        throws com.emc.eccapi.framework.InterfaceNotFound
    {
    try
    {
    java.lang.Object obj =
com.emc.eccapi.server.NamingService.getComponentInterface (
                                    "TestComponentBook"
                                    ,"1.0"
                                    ,"BookDiscovery"
        );
        return new
        com.emc.eccapi.bridge.book.BookDiscoveryImpl_(obj);
    {
    catch (com.emc.eccapi.framework.ComponentNotFound e)
    {
    throw new com.emc.eccapi.framework.InterfaceNotFound(
            "Failed to locate component TestComponentBook."
            ,e
                                                    );
```

In the exemplary code fragment in Table II, a particular component, say MyComponent, requires access to the Book-Discovery interface of the component TestComponentBook, on which it depends. The generation tool emits the method declaration in MyComponent's coFactories, and the method's definition, shown in Table II, in MyComponent's coBridge. In Table II, locating the naming service is delegated to the server infrastructure; the names of the sought after interface and the required component are emitted; finally, the generative approach guarantees the proper type of the downcast. Errors are handled by throwing an exception if either the component or its interface is absent.

The exemplary component architecture discussed herein is disclosed in further detail in copending U.S. patent application Ser. No. 11/096,246, filed Mar. 31, 2005, entitled "SYSTEM AND METHODS FOR IMPLEMENTING A SOFTWARE COMPONENT DEVELOPMENT ARCHITECTURE", incorporated herein by reference. Since the coClass (business logic of the application) implements the coFactories (interfaces), the developer of MyComponent can access the TestComponentBook by simply invoking the method _create_book_BookDiscovery( ) within the coClass, which is implemented in the coBridge.

In addition, the bridge approach solves the so-called "version upgrade" problem. Specifically, consider the case where a client 110-3 requests version 1.2 of the server component 110-1, while the component server hosts version 1.4 Noticing that the major numbers are identical, and the minor number requested by the client is smaller or equal to the minor number of the server component. The mediator service transparently retrieves the version 1.4 component. If, however, the client requests version 1.5 (whose minor number is greater) of that of the server component, then the mediator service (e.g. naming service) would refuse the request by throwing an exception. Any mismatch in the major version between server and client components results in analogous behavior.

Figure 2:
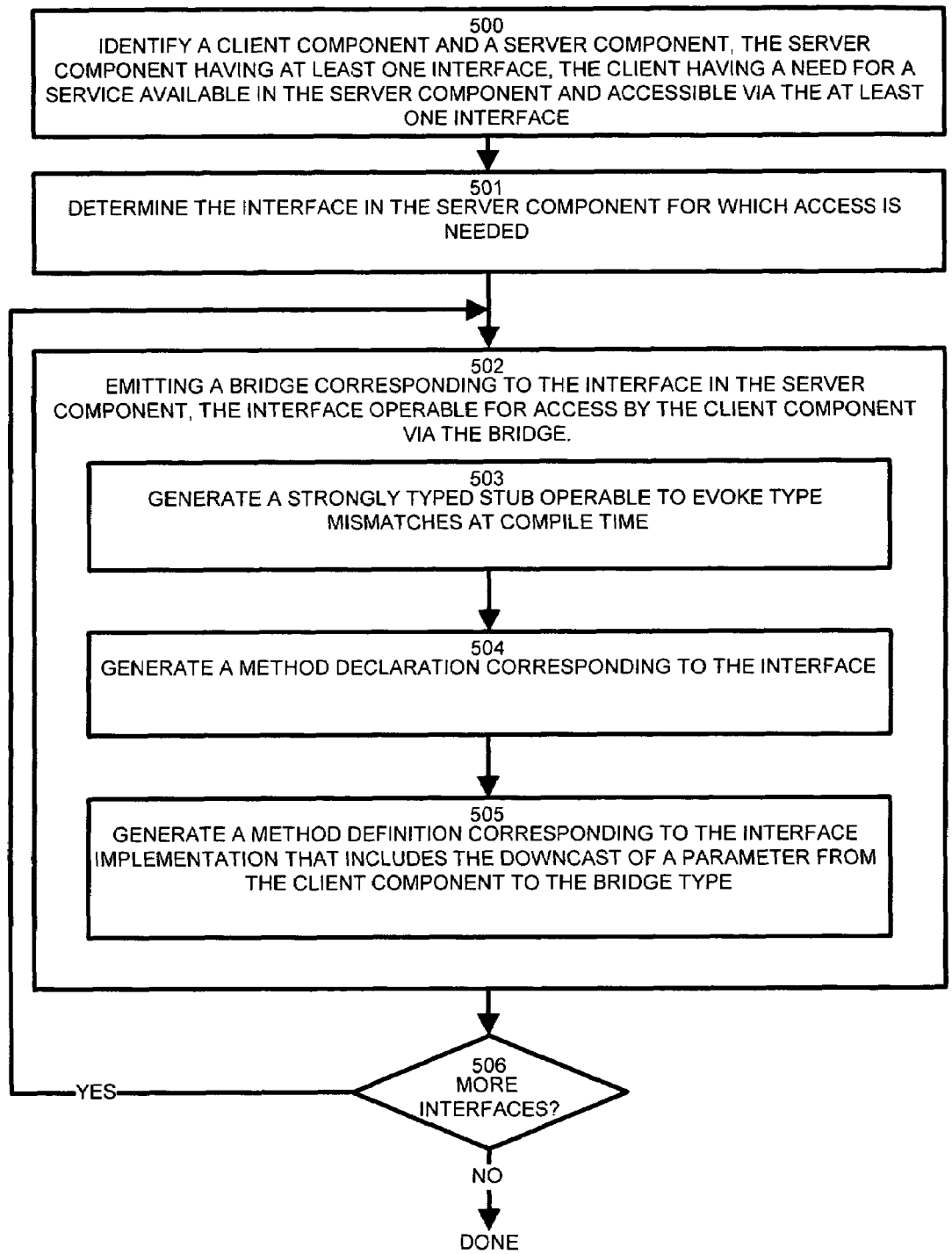
FIG. 2 is a flowchart illustrating the method of generating a software interface in accordance with embodiments of the invention.

FIG. 2 is a flowchart illustrating the method of generating a software interface as performed by the code generator 119 as defined and claimed herein. Generally, the system in FIGS. 1 and 2 operates the build system 116 including the code generator 119 to emit 118 a method declaration in a coFactory and emit, in a coBridge, a method definition corresponding to the method declaration. Also, the system emits, for use by the method definition, names of interfaces and required components for use by a naming service operated by a server infrastructure.

More specifically, referring to FIGS. 1 and 2, in step 500 the build system 116 identifies a client component 110-3 and a server component(s). The server component 110-1, 110-2 has at least one interface 112-1 and 112-2 and the client 110-3 has a need for a service available in the server component(s) 110-1 and 110-2 that is accessible via the interface(s) 112-1 and/or 112-2.

Next, in step 501 the code generator 119 identifies or determines the interface for which access is needed.

In step 502, the build system 116 emits a bridge class 118 corresponding to the interface 112 in the server component that allows the interface 112 to be operable for access by the client component 110-3 via the bridge 118. Generally, in step 502, the system operates to emit a method declaration in a coFactory and emit, in a coBridge, a method definition corresponding to the method declaration. Also, the system emits, for use by the method definition, names of interfaces and required components for use by a naming service operated by a server infrastructure.

More specifically, in step 503 the code generator 119 emits the bridge 118 that includes generating a strongly typed stub operable to evoke type mismatches at compile time.

Next, in step 504 the build system 116 then generates a method declaration corresponding to the interface 112.

In step 505, the build system 116 generates a method definition corresponding to the interface implementation that includes the downcasting of a parameter from the client component 110-3 to a bridge type.

In step 506, the build system 116 performs a check to determine if there are more interfaces for which bridges 118 are to be emitted for this component. If so, control reverts to step 502 for the remaining interfaces. Otherwise, the set of emitted bridges 118 is complete and the collectively effectively abstract the generated interfaces to each of the components having a need for access to at least one of the generated interfaces.

From the above processing, it can be seen that the strongly-typed interface access framework discussed above limits visibility of component interfaces. The emitted bridge code 118 provides a framework that limits interface visibility to a predetermined visible bridge interface. A bridge is referenced from the application code, transforms the parameters via typecasting, and invokes the corresponding component operation for providing the desired service results, or function.

Accordingly, particular configurations of the invention are directed to the observation that, in a large software environment, service name and parameter (attribute) type mismatches may be exacerbated by excessive proliferation of service (method interface) names and over inclusive visibility. For example, a naming resolution typo results in runtime string mismatch error, since recognition is by text string, rather than variable/identifier, thus the error is moved from compile time to runtime. The software build system 116 described above thus emits strongly typed bridges 118 for use by a client component 110-3 to access interfaces 112-1 and 112-2 of server components 110-1 and 110-2. The code generation tool 119 emits a method declaration in a coFactory and further emits the method's definition in a coBridge. Additionally, the names of the sought after interface and the required component are emitted. The generative approach guarantees the proper type of a downcast. Errors are handled by throwing an exception if either the component or its interface is absent. The problems of conventional systems are substantially circumvented by a function invocation, and the coClass implements the coFactories, and the developer of the component can access the other component by invoking a method within the coClass, which is implemented in the coBridge.

Those skilled in the art should readily appreciate that the programs and methods for emitting an interface as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for emitting an interface has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A computer-implemented method in which a computer system initiates execution of software instructions stored in memory for generating a software interface, the computer implemented method comprising:

identifying a client component and a server component, the server component having at least one interface, the client having a need for a service available in the server component and accessible via the at least one interface;

locating the interface in the server component for which access is needed;

emitting a bridge corresponding to the interface in the server component, the interface operable for access by the client component via the bridge;

wherein generating the bridge further comprises generating a strongly typed stub operable to evoke type mismatches at compile time;

wherein emitting the bridge further comprises:

generating a method declaration corresponding to the interface;

generating a method definition corresponding to the interface;

downcasting a parameter from the client component to a bridge type, the bridge type compatible with the interface in the client component;

wherein locating the interface further comprises:

invoking a naming service with the identity of the interface;
receiving, from the naming service, a name of the interface
receiving the identity of the required component;

wherein emitting further comprises:

generating, in a code generator, bridges for each of the exposed interfaces in a particular component; and abstracting the generated bridges to each of the components having a need for access to at least one of the generated interfaces.

2. The computer-implemented method for generating a software interface of claim 1 wherein emitting a bridge comprises:

emitting a method declaration in a coFactory;

emitting, in a coBridge, a method definition corresponding to the method declaration; and emitting, for use by the method definition, names of interfaces and required components for use by a naming service operated by a server infrastructure.

3. The computer-implemented method of claim 1 further comprising generating a plurality of bridges corresponding to each of a plurality of interfaces in a server component.

4. A computing device for executing component servers employing generated software bridges comprising:

a build system operable to identify a client component and a server component, the server component having at least one interface, the client having a need for a service available in the server component and accessible via the at least one interface, a code generator in the build system operable to:

locate the interface in the server component for which access is needed;

emit a bridge corresponding to the interface in the server component, the interface operable for access by the client component via the bridge;

wherein generating the bridge further comprises generating a strongly typed stub operable to evoke type mismatches at compile time;

wherein emitting the bridge further comprises:

generating a method declaration corresponding to the interface;

generating a method definition corresponding to the interface;

downcasting a parameter from the client component to a bridge type, the bridge type compatible with the interface in the client component; wherein locating the interface further comprises:

invoking a naming service with the identity of the interface;
receiving, from the naming service, a name of the interface;
receiving the identity of the required component;

wherein emitting further comprises:

generating, in a code generator, bridges for each of the exposed interfaces in a particular component; and abstracting the generated bridges to each of the components having a need for access to at least one of the generated interfaces.

5. The computing device of claim 4 wherein the generated bridge is operable to downcast a parameter from the client component to the bridge type, the bridge type compatible with the interface in the client component;

wherein the build system is operable to generate a strongly typed stub operable to evoke type mismatches at compile time; and wherein to emit the bridge, the code generator is operable to:

emit a method declaration in a coFactory;

emit, in a coBridge, a method definition corresponding to the method declaration; and emit, for use by the method definition, names of interfaces and required components for use by a naming service operated by a server infrastructure.

6. The computing device of claim 5 wherein the code generator is further operable to:

invoke a naming service with the identity of the interface;
receive, from the naming service, the identity of the required component.

7. The computer-implemented method of claim 1, wherein emitting the bridge comprises:

emitting a strongly typed bridge class to the client component for accessing each interface of the server component, the strongly typed bridge class including a strongly typed stub that evokes type mismatches at compile time;

emitting a method declaration in a generated interface of the client component;

emitting a method definition in the strongly typed bridge class of the client component, emitting the method definition includes downcasting a parameter from the client component to a bridge type; and emitting, for use by the method definition, names of interfaces and required components for use by a naming service operated by a server infrastructure.

8. The computer-implemented method of claim 7, wherein emitting the strongly typed bridge class includes limiting visibility of each interface to a predetermined visible bridge interface, and wherein the strongly typed stub is independent of Common Object Request Broker Architecture (CORBA).

9. The computer-implemented method of claim 7, further comprising:
- requesting a first version of the server component, the requested first version identified by a major version number and a minor version number, the server component currently operating a second version of the server component identified by a major version number and minor version number;
- upon identifying that the major version number of the first version and the major version number of the second version are identical and the minor version number of the first version requested by the client component is smaller than or equal to the minor version number of the second version operated by the server component, retrieving the second version of the server component for the client component; and
- upon identifying that the minor version number requested by the client component is greater than the minor version number operated by the server component, throwing an exception.

10. The computer-implemented method of claim 1, wherein emitting the bridge comprises:
- emitting a strongly typed bridge class to the client component for accessing each interface of the server component, the strongly typed bridge class specifying one or more restrictions on how operations involving values having different data types can be intermixed, the strongly typed bridge class defining inheritance of object classes;
- emitting a method declaration in a generated interface of the client component;
- emitting a method definition in the strongly typed bridge class of the client component, emitting the method definition includes converting a parameter from the client component to a bridge type; and
- emitting, for use by the method definition, names of interfaces and required components for use by a naming service operated by a server infrastructure.

11. The computer-implemented method of claim 7, further comprising:
- aggregating each of the interfaces corresponding to a component, aggregating including gathering each of the interfaces as an abstracted component interface;
- generating strongly typed stubs for each of the aggregated interfaces;
- injecting the generated interfaces into the component; and
- upon identifying that a component of the interface is absent, throwing an exception error.

* * * * *